US011906170B2

(12) United States Patent
Combs et al.

(10) Patent No.: US 11,906,170 B2
(45) Date of Patent: Feb. 20, 2024

(54) MAGNETIC POSITIONING HINGE FOR HORIZONTAL DOOR ASSEMBLY

(71) Applicant: WINSTON INDUSTRIES, LLC, Louisville, KY (US)

(72) Inventors: Kevin Paul Combs, Louisville, KY (US); Trevor Jordan Carver, Alexandria, KY (US)

(73) Assignee: WINSTON INDUSTRIES, LLC, Louisville, KY (US)

( * ) Notice: Subject to any disclaimer, the term of this patent is extended or adjusted under 35 U.S.C. 154(b) by 604 days.

(21) Appl. No.: 16/862,522

(22) Filed: Apr. 29, 2020

(65) Prior Publication Data

US 2020/0363070 A1 Nov. 19, 2020

Related U.S. Application Data

(60) Provisional application No. 62/840,122, filed on Apr. 29, 2019.

(51) Int. Cl.
*F24C 15/02* (2006.01)
*E05D 3/02* (2006.01)
*E05D 11/10* (2006.01)

(52) U.S. Cl.
CPC .............. *F24C 15/023* (2013.01); *E05D 3/02* (2013.01); *E05D 11/1028* (2013.01); *E05Y 2201/418* (2013.01); *E05Y 2201/46* (2013.01); *E05Y 2201/682* (2013.01); *E05Y 2800/674* (2013.01); *E05Y 2900/132* (2013.01); *E05Y 2900/308* (2013.01)

(58) Field of Classification Search
CPC ..... F24C 15/023; E05D 3/02; E05D 11/1028; E05Y 2201/418; E05Y 2201/46; E05Y 2201/682; E05Y 2800/674; E05Y 2900/132; E05Y 2900/308
USPC .......................................................... 126/194
See application file for complete search history.

(56) References Cited

U.S. PATENT DOCUMENTS 3,299,879 A 1/1967 Doner
4,665,892 A 5/1987 Spargo et al.
5,025,776 A 6/1991 Hanley et al.
5,496,104 A * 3/1996 Arnold ...................... E05D 7/04 312/204
6,120,119 A * 9/2000 Jelinski .................. F26B 25/12 74/519
7,089,627 B2 * 8/2006 Seidler .................. B65D 51/04 206/823
8,584,321 B2 11/2013 Trautner et al.
9,074,400 B2 7/2015 Mirshekari et al.
9,181,737 B1 11/2015 Kadus et al.
(Continued)

FOREIGN PATENT DOCUMENTS

KR 0130261 Y1 * 7/1993

*Primary Examiner* — Avinash A Savani
(74) *Attorney, Agent, or Firm* — Carrithers Law Office, PLLC

(57) ABSTRACT

An integrated magnetic catch used to hold a horizontal hinged oven door open at a selected set partially open position. A pin is used to hold the two plates together and acts as a pivot point. Attached to a stationary plate is a bracket that houses a magnet. This bracket is formed having a preset angle that correlates with the degree that the door is to be opened. When the rotating hinge makes contact with the bracket, the magnetic force holds the door open at a selected angle.

22 Claims, 7 Drawing Sheets

(56) References Cited

U.S. PATENT DOCUMENTS

| | | | | |
|---|---|---|---|---|
| 9,185,980 | B1* | 11/2015 | Kane | A47B 88/944 |
| 9,541,295 | B2 | 1/2017 | Adelmann et al. | |
| 9,759,000 | B2* | 9/2017 | Stuart | E05D 5/06 |
| 9,832,820 | B2 | 11/2017 | Darney | |
| 9,840,862 | B2 | 12/2017 | Kadus et al. | |
| 9,874,354 | B2 | 1/2018 | Jadhav et al. | |
| 10,138,669 | B2 | 11/2018 | Vanini | |
| 2005/0121433 | A1* | 6/2005 | Kim | F24C 15/34 219/401 |
| 2007/0157432 | A1* | 7/2007 | Weinstein | E05D 11/00 16/320 |
| 2008/0078373 | A1 | 4/2008 | Kim et al. | |
| 2008/0289144 | A1 | 11/2008 | Vanini | |
| 2010/0127606 | A1 | 5/2010 | Collene et al. | |
| 2011/0095019 | A1 | 4/2011 | Davies | |
| 2012/0067333 | A1 | 3/2012 | Mirshekari et al. | |
| 2015/0308172 | A1* | 10/2015 | Veino | E06B 5/00 49/380 |
| 2018/0328593 | A1 | 11/2018 | Grobleben et al. | |
| 2019/0040667 | A1* | 2/2019 | Feng | E05F 3/20 |
| 2019/0040670 | A1 | 2/2019 | Dora | |

* cited by examiner

MAGNETIC POSITIONING HINGE FOR HORIZONTAL DOOR ASSEMBLY

CROSS REFERENCES TO RELATED APPLICATIONS

This application claims priority from U.S. Provisional Application Ser. No. 62/840,122 filed on Apr. 29, 2019 which is incorporated by reference herein in its entirety.

TECHNICAL FIELD OF THE INVENTION

This invention relates to an integrated magnetic catch used to hold a horizontal hinged oven door open at a selected angle.

BACKGROUND OF THE INVENTION

The present invention pertains to an improved door hinge assembly for ovens and food storage cabinets and the like.

In fast food restaurants and cafeterias, food is prepared in an oven and served or maintained at a selected temperature for serving in a heated cabinet with controls for temperature and/or humidity. Typically these ovens or food service cabinets are vertical and have horizontally hinged doors which are raised upward for access. When a server selects an item for a customer, the server opens the oven or storage cabinet door with one hand and obtains the food item with the other closing the door; or simply secures the door in an open position for removal of one or more food items. Holding the door open is inconvenient and inefficient.

In order to maintain food textures after cooking, with controlled vapor holding cabinet using heated water vapor to precisely control temperatures such as are available from Winston Industries which give accurate food temperatures from 90 to 180 degrees allowing the user to adjust temperatures accordingly for proofing, holding, and serving. Propping the door open for an extended period of time can result in food drying out, cooling down and losing moisture, in addition to compromising the temperature and humidity of the food preparation apparatus.

Conventional oven door positioning hinges used on food service ovens have mechanical positioning components such as springs, notches, and latches that wear down over time. The present invention provides a positional hinge and holding means for releasibly and temporarily holding a shelf door open at a selected position out of the way of the food server.

SUMMARY OF THE INVENTION

A magnetic positioning hinge assembly utilizers an integrated magnetic catch used to hold a door open at a set position or angle. The present invention utilities a pair of plates, made of ferrous material, are bent around a centerline to accept a pin. This pin is used to hold the two plates together and acts as a pivot point. Attached to the stationary plate is a bracket that houses a magnet. This bracket formed with a preset angle in mind that correlates with the degree that the door is to be opened. When the rotating hinge makes contact with the bracket, the magnetic force holds the door open. The hinge allows for the easy and quick access to the oven.

The hinge portion of the oven cabinet door frame hinge utilizes at least a pair of metal hinge plates bent around a centerline to accept a pin. This pin is used to hold the upper frame plate and lower door plate together and acts as a pivot point. Attached to the stationary frame plate is a bracket that houses a magnet forming a magnetic member having a preset angle that correlates with a selected degree that the door is to be held partially open whereby the rotating hinge allows the metal or magnetic surface of the door plate to contact the magnetic member so the magnetic force holds the door to the magnetic member open.

It is an object of the present invention to utilize magnets having a grade or from n35 to n52.

It is an object of the present invention to provide a means for setting an angle and potential angle range for opening a horizontal hinged door whereby the hinge can accommodate any inner angle equal to or less than 180 degrees.

It is an object of the present invention to provide a means for using ABS plastic for the magnet housing so it does not shield the magnetic field of the plastic hinge.

It is an object of the present invention to determine an inner angle of an open hinge by the height of an open door and to minimize moment on the door.

It is an object of the present invention to provide a horizontal hinge and door assembly with a magnetic catch for use on any type of cabinet, appliance of apparatus having a horizontal hinged panel, door, or window where it is desirable to hold a window, door, or other panel partially open at a selected angle for a selected period of time.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
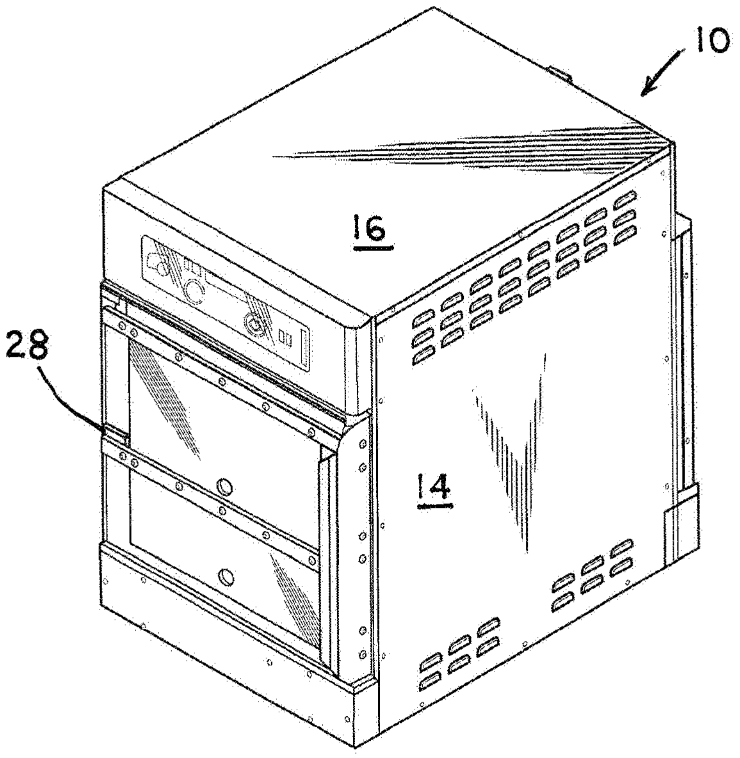
FIG. 1 is a perspective view of a food service oven showing a pair of doors for accessing a top and bottom shelf.
Figure 2:
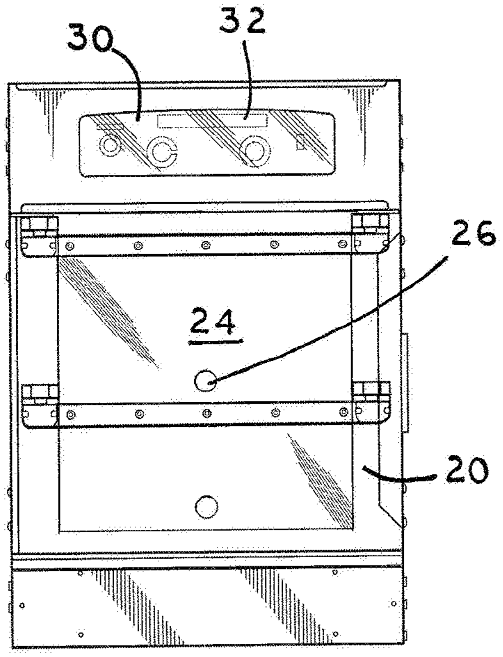
FIG. 2 is a front view of FIG. 1 showing upper and lower front doors.
Figure 3:
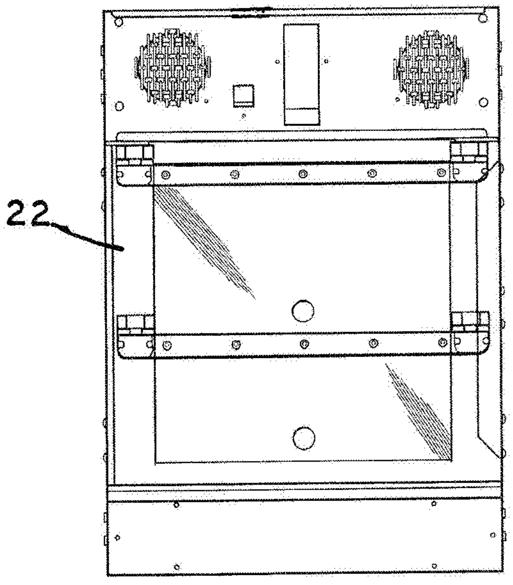
FIG. 3 is a rear view of FIG. 1 showing upper and lower rear doors.
Figure 4:
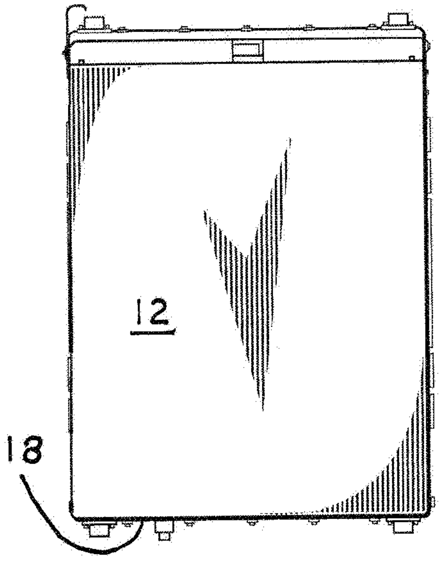
FIG. 4 is a left side view of FIG. 1.
Figure 5:
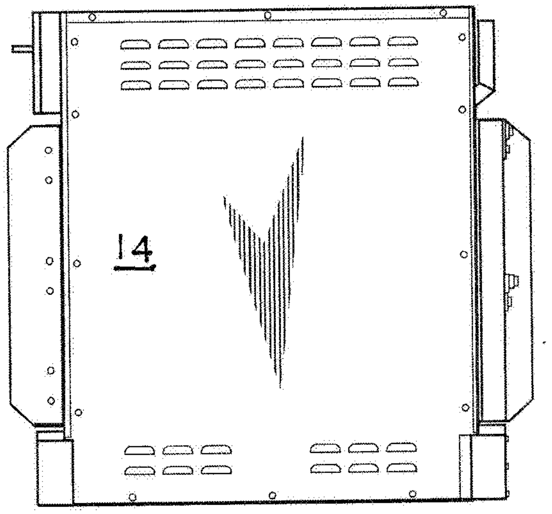
FIG. 5 is a right side view of FIG. 1.
Figure 6:
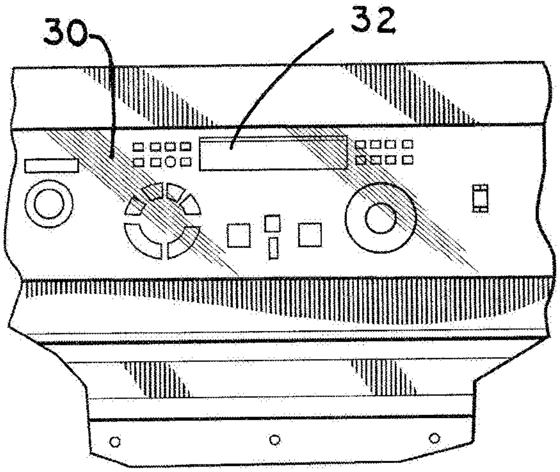
FIG. 6 is a enlarged view showing the control panel for the foods service oven.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

As used herein, the term “about” can be reasonably appreciated by a person skilled in the art to denote somewhat above or somewhat below the stated numerical value, to within a range of ±10%.

The information included in this section, data or specifications, including any references cited herein and any description or discussion thereof, is included for exemplary purpose only and is not to be regarded as subject matter by which the scope of the invention as defined in the claims appended hereto is to be bound.

The following text sets forth a broad description of numerous different embodiments of present disclosure. The description is to be constructed as exemplary only and dose not describes every possible embodiment since describing every possible embodiment would be impractical if not impossible. It will be understood that any feature, characteristic, component, composition, ingredient, product, step or methodology described herein can be deleted, combined with or substituted for, in whole or part, any other feature, characteristic, composition, ingredient, product, step or methodology described herein. Numerous alternative embodiments could be implemented, using either current technology or technology developed after the disclosure date of the invention.

The description of the exemplary embodiments according to principles or spirits of the present invention is intended to be read in connection with the accompanying drawings, which are to be regarded as part of the entire written description. In the description of the embodiments of the invention disclosed herein, for describing precisely and concisely, each element in the drawings is assigned a reference number in most cases in term of its feature corresponding the claims append unless expressly described otherwise, e.g., if a valve is claimed, no matter the valve is a ball valve, a membrane valve, or poppet valve in an exemplary embodiment, the valve members or valve seats in different drawings are assigned one element reference number unless expressly described otherwise.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Magnets suitable for the present invention include industrial permanent magnets or any magnetic substance that produces a magnetic field. This magnetic field is invisible but is responsible for the most notable property of a magnet: a force that pulls on other ferromagnetic materials, such as iron, and attracts or repels other magnets. A permanent magnet is an object made from a material that is magnetized and creates its own persistent magnetic field. Materials that can be magnetized, which are also the ones that are strongly attracted to a magnet, are called ferromagnetic (or ferromagnetic). These include the elements iron, nickel and cobalt, some alloys of rare-earth metals, and some naturally occurring minerals such as lodestone.

Permanent magnets are made from "hard" ferromagnetic materials such as alnico and ferrite that are subjected to special processing in a strong magnetic field during manufacture to align their internal microcrystalline structure, making them very hard to demagnetize. Metals are ferromagnetic when found in their natural states, as ores. These include iron ore (magnetite or lodestone), cobalt and nickel, as well as the rare earth metals gadolinium and dysprosium (when at a very low temperature).

Ceramic, or ferrite, magnets are made of a sintered composite of powdered iron oxide and barium/strontium carbonate ceramic and can be formed in various shapes. The resulting magnets are non-corroding but brittle, but may be impregnated in a polymer or held in a housing. Alnico magnets are made by casting or sintering a combination of aluminum, nickel and cobalt The ferrite magnets are made from iron oxide and Ba- or Sr-carbonate.

Injection-molded magnets are a composite of various types of resin and magnetic powders, allowing parts of complex shapes to be manufactured by injection molding.

Flexible magnets are composed of a high-coercivity ferromagnetic compound (usually ferric oxide) mixed with a plastic binder. This is extruded as a sheet and passed over a line of powerful cylindrical permanent magnets.

Rare earth (lanthanoid) are used in compact high-strength magnets. The most common types of rare-earth magnets are samarium-cobalt and neodymium-iron-boron (NIB) magnets.

A Mn—Al alloy has a higher saturation magnetization than the ferrite magnets. Neodymium-iron-boron (NIB) magnets are among the strongest.

A conventional oven or a controlled vapor oven as illustrated in FIGS. 1-8, is typically used in the food industry for cooking or holding food at selected temperature and humidity includes a left side 12, a right side 14, a top 16, a bottom panel 18, a front panel 20 and back panel 22. In the upper portion of the oven 10 is at least one front door 24, which has a handle or knob 26, and which pivots about horizontal hinges 28. Above the front door 24 is shown a control panel 30 a display 32 indicates various words and numbers to communicate with the person using the oven. Below the display 32 are buttons for controlling the program, the upper heater temperature, the lower heater temperature, and the cook time, respectively. A switch turns the oven on and off. A plurality of lights indicate when the upper heating element, lower heating element or elements there between are turned on and off. The oven 10 is supported by on legs or rubber feet 34.

The front door 24 is hinged to the oven 10 by a horizontal magnetic positioning hinge 50 at the front of the oven and pivot about a pivot axis. The front door 24 pivots from a horizontal, raised position to a lowered position. A pin 36 extends through guide slots 38 attaching to the front surface 40 of the front panel 20 permitting the pin 36 to rotate or hinge to rotate thereabout as the front door 24 pivots.

As illustrated in Figures, the food service oven showing a pair of doors for accessing a top and bottom shelf including upper and lower front doors and a control panel for the foods service oven. The oven cabinet door frame having a top and bottom door showing a pair of spaced apart magnetic holding members mounting to the top portion of each oven frame hinge for engagement with an adjacent opposing metal or magnetic strip attached to the door hinge.

The magnetic oven hinge assembly utilizes an integrated magnetic positioner or catch to hold a door open at a set position or angle.

Figure 7:
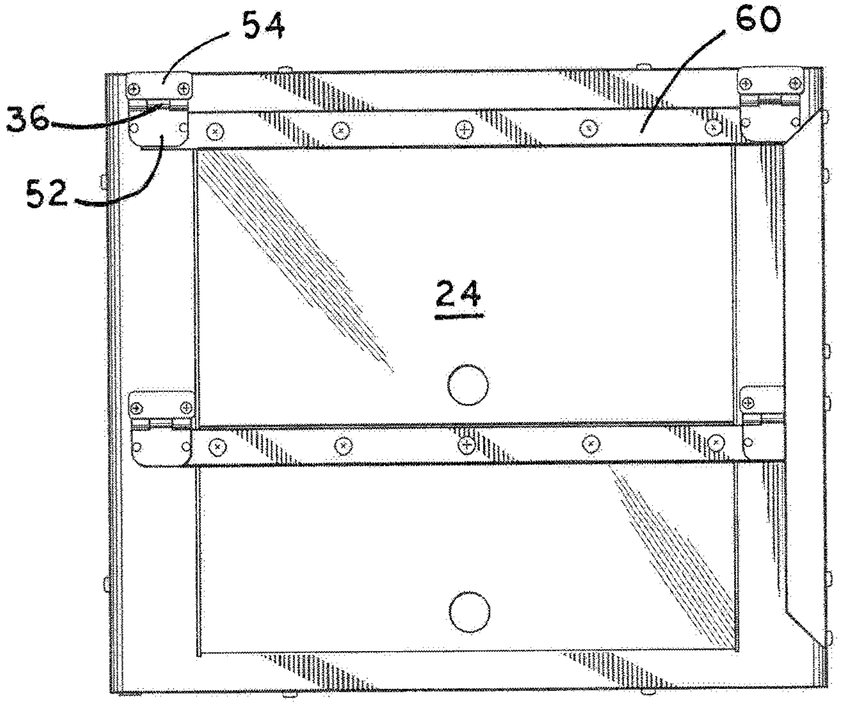
FIG. 7 is a front view of a oven cabinet door frame having a top and bottom door.
Figure 8:
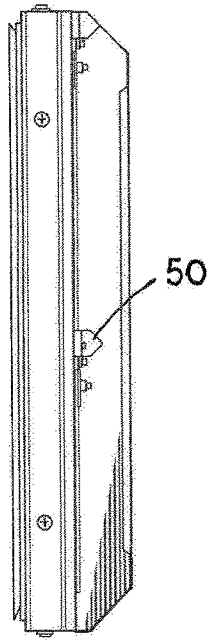
FIG. 8 is a side view of the door frame and hinge assembly.

One preferred embodiment of the present invention utilities a pair of horizontal hinges each one comprising a pair of hinge plates made of ferrous material, aluminum brass, or polymer, bent around a centerline to accept a pin. The surface of the door panel hinge plate 52 must be a ferrous or magnetic material or coated with or containing a ferrous or magnetic material for cooperative engagement with the hinge plate of the front panel 20. The pin is used to hold the two hinge plates 52, 54 together and acts as a pivot point. As shown in FIG. 7 the oven cabinet door frame includes a top and bottom door showing a pair of spaced apart magnetic holding members mounting to the top portion of each oven frame hinges for engagement with an adjacent opposing metal or magnetic strip attached to the door hinge.

The hinge plate 54 containing the magnet or magnetic material is attached to the front surface of the front panel 20 and the opposing hinge plate 52 is attached to the front panel 20 of the oven 10. A magnetic positioning hinge assembly 50 attaches to the outside surface of the hinge plate 54 of the front panel 20 which houses a permanent magnet, magnetic material, or polymer impregnated with a magnetic material 51. The magnet and/or bracket may be covered by a coating, film or polymer 53 such as ABS which does not interfere with the magnetic properties of the magnet. This bracket is formed with a preset angle in mind that correlates with the degree that the door is to be opened. When the door is opened and the metallic rotating ferrous hinge plate 52 of the door makes contact with the magnetic positioning hinge assembly 50, the magnetic attractive force removably attracts and holds the front door 24 with the front door panel hinge 52 abutting the magnetic positioning hinge assembly 50 attaching to the door hinge 54. The hinge allows for the easy and quick access to the oven.

Figure 9:
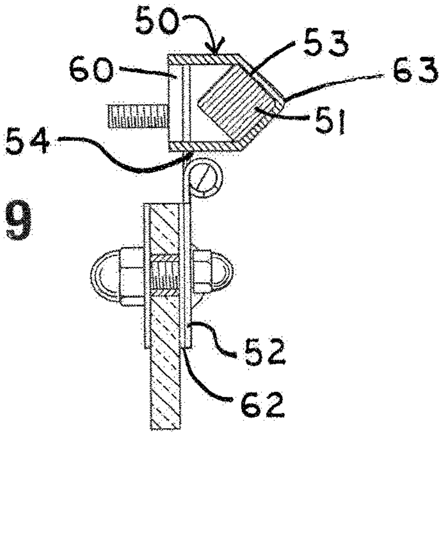
FIG. 9 is a sectional side view of the hinge showing the door panel frame and hinge assembly.
Figure 11:
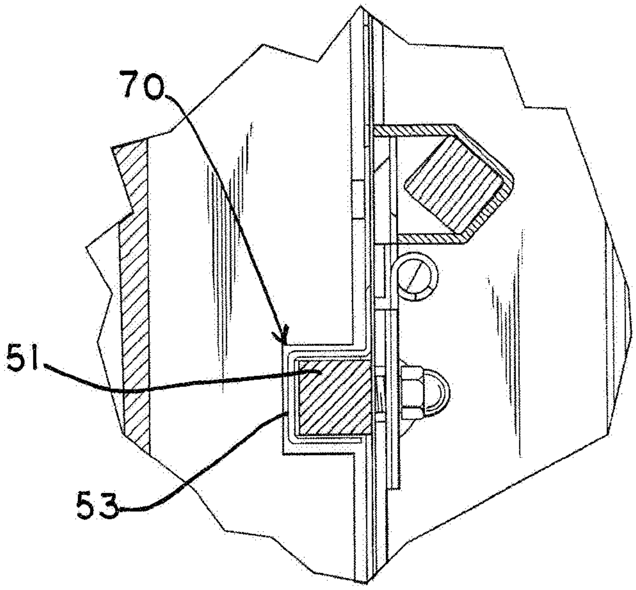
FIG. 11 is a sectional view showing the oven panel frame plate having a magnetic holding member attached and an opposing magnetic bracket mounted to the opposing side of the oven panel frame member.
Figure 12:
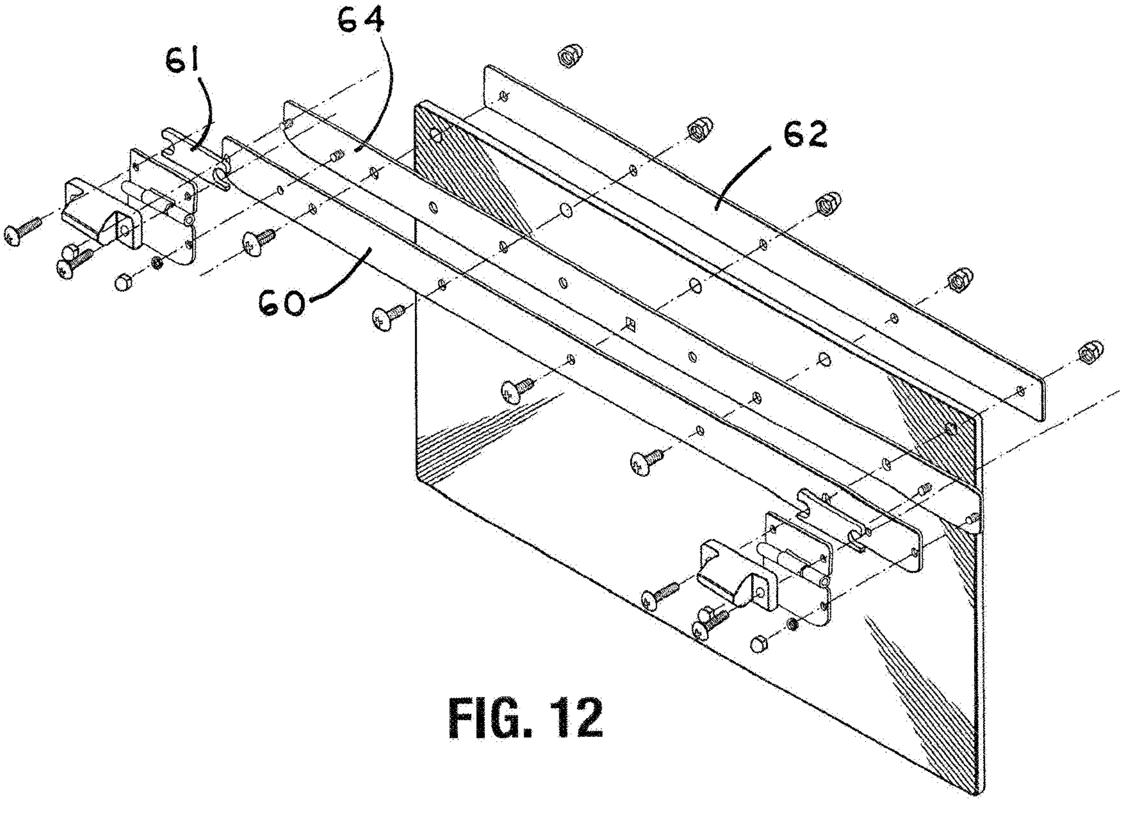
FIG. 12 is an exploded perspective view of the door assembly.
Figure 13:
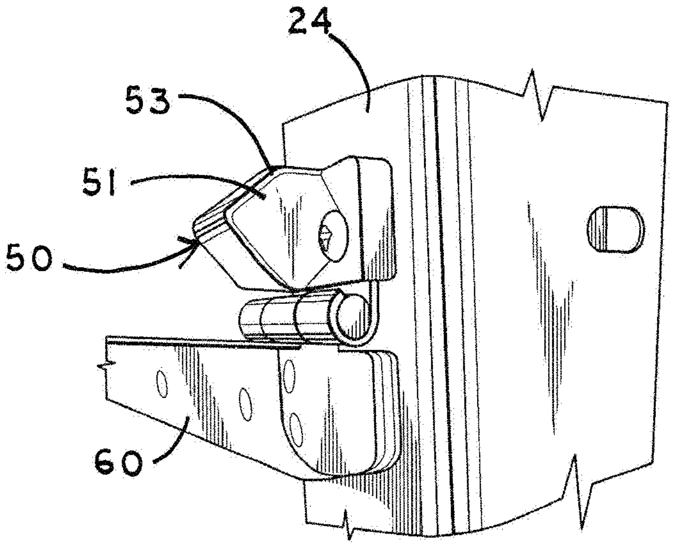
FIG. 13 is a perspective view of the oven door frame and hinge assembly and the projecting magnetic holding member having a wedge shaped projection for holding an oven door at a selected angle.
Figure 14:
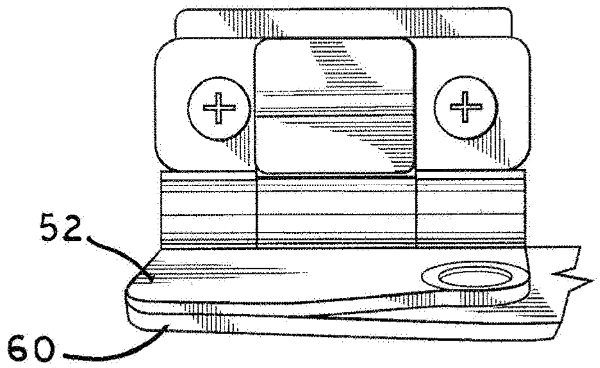
FIG. 14 is a front view of the oven door and frame assembly.
Figure 15:
FIG. 15 is a perspective view showing a oven door frame and hinge assembly.
Figure 16:
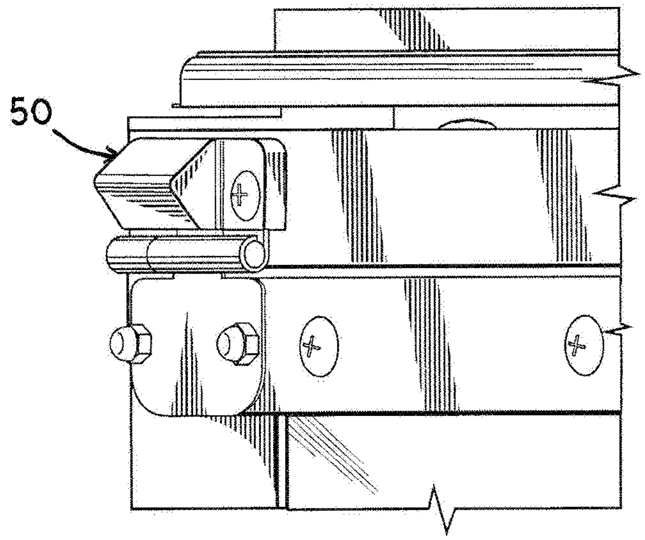
FIG. 16 is a perspective view of the door frame and hinge assembly and the projecting magnetic holding member having a wedge shaped projection for holding an oven door at a selected angle and showing the door hinge plate for cooperative magnetic engagement with the magnetic holding member.
Figure 17:
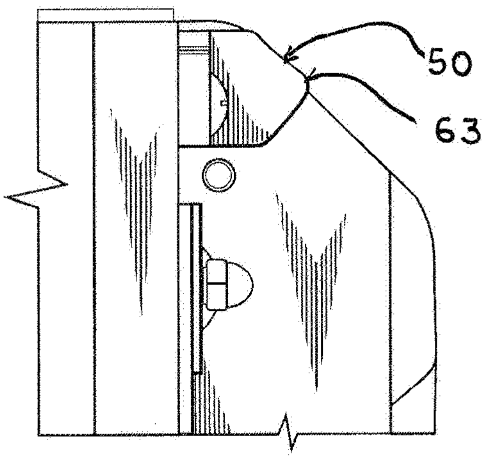
FIG. 17 is a side view of the oven door frame and hinge assembly.
Figure 18:
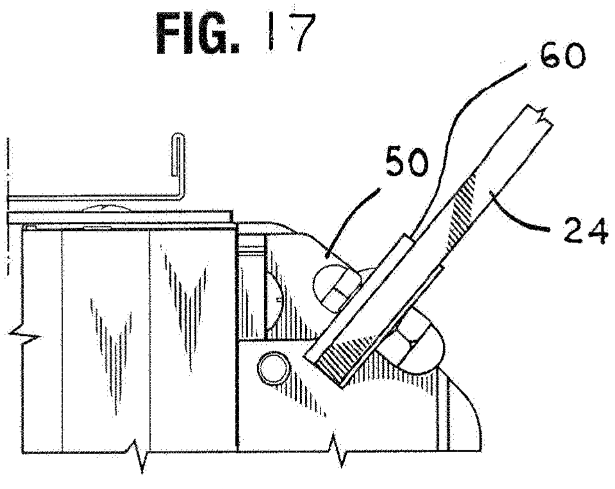
FIG. 18 is a side view of the oven door frame and hinge assembly and the projecting magnetic holding member having a wedge shaped projection holding an oven door open upward at a selected angle and showing the magnetic conducting door hinge plate cooperatively magnetically engaging the magnetic holding member.

As shown in FIGS. 9 and 11, the door panel frame and hinge utilize a pair of metal hinge plates 52, 54 bent around a centerline to accept a pin 36. The pin 36 is used to hold the upper frame plate 60 and lower door plate 62 together and acts as a pivot point. Attached to the stationary upper frame plate 60 is the magnetic positioning hinge assembly 50 that houses a magnetic material such as neodymium magnet forming a magnetic member 51 disposed in a metal and or plastic housing 53 having a horizontal wedge formed at a preset angle that correlates with a selected degree that the door is to be held partially open whereby the rotating hinge allows the metal or magnetic surface of the door plate to contact the magnetic member so that the door plate rests against and is supported by the horizontal wedge portion 63 of the magnetic positioning hinge assembly 50 the magnetic force holds the door to the magnetic member open.

Figure 10:
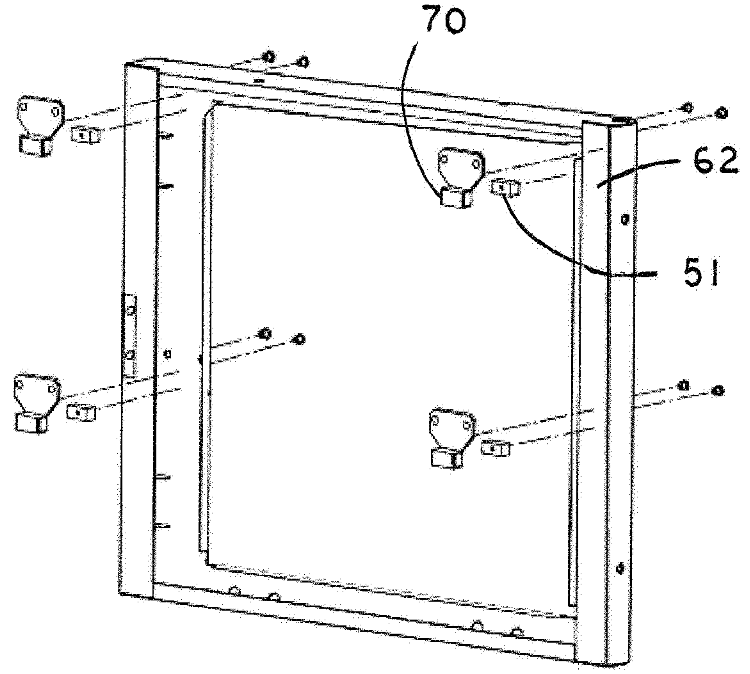
FIG. 10 is a rear view showing a rear oven door frame with magnets disposed in plastic housings affixed thereto.

As shown in FIGS. 10 and 11, a magnetic holding member bracket 70 is attached on the inner surface of the panel frame 62 having a magnetic member 51 therein for contacting the door hinge plate wherein the magnet is mounted in a recess of the frame in magnetic communication with the door panel hinge plate aligned therewith on the opposing side of the door panel.

A first outer horizontal strip 60 mounting to the top of a door panel connects to a second intermediate strip 64 mounting on an opposing side of the door panel in alignment with the first outer horizontal strip and having an third inner panel strip 62 covering and mounting to the second intermediate strip, with a pair of magnetic positioning hinge assemblies 50 mounted to the outside of the first outer horizontal strip 60. A spacer 61 and a hinge assembly comprising a pair of pivoting hinge plates joined by a wire connector and having a magnetic bracket comprising a plastic housing having a magnet disposed therein is affixed to the bottom portion of the hinge plate defining the oven door hinge plate.

As illustrated in FIGS. 13-18, the pair of spaced apart magnetic holding members mount to the top portion of the oven frame hinge plate in cooperative engagement with an adjacent opposing metal or magnetic strip attached to the door hinge plate. The oven frame plate has a magnetic holding member attached thereto extending outwardly therefrom a selected distance and having an angled projecting surface for contacting the door hinge plate shown including an a magnet mounted in a recess of the frame in magnetic communication with the door hinge plate aligned therewith on the opposing side of the door panel.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. An oven having a magnetic positioning hinge for a horizontal door assembly, comprising:

an oven including a left side, a right side, a top, a bottom panel, a front panel and back panel and at least one pivoting front door, having means for opening, said front door including a pair of spaced apart aligned horizontal magnetic positioning hinges affixed to said front panel above said front door for supporting said at least one front door, and each one of said pair of horizontal magnetic positioning hinges comprising a pair of pivoting hinge plates including a top plate and a bottom plate joined by a pin, said top plate attaching to said front panel of said oven and having a a wedge shaped housing including a magnet disposed therein, and said bottom plate including a magnetic metal or magnetic material attaching to said of door frame alignable with said wedge of said top plate, whereby pivoting said front door upward contacting said wedge releasably retains said front door in an upward position at a selected angle.

2. The oven and magnetic door assembly of claim 1, further including a magnetic door bottom plate having a housing including an opposing magnet for cooperative magnetic engagement with said wedge.

3. The oven and magnetic door assembly of claim 1 wherein said front door can be held open at an angle of up to 180 degrees.

4. The oven and magnetic door assembly of claim 1, wherein said oven is a convention oven.

5. The oven and magnetic door assembly of claim 1, wherein said oven is a controlled vapor oven.

6. The oven and magnetic door assembly of claim 1, wherein said wedge is formed at a selected preset angle correlating to a selected degree the front door is held open upon said magnet or magnetic material of said bottom plate contacts said wedge containing said magnet.

7. The oven and magnetic door assembly of claim 1, wherein said wedge is formed of a selected size and shape to cooperatively engage said magnetic metal or magnetic material and releasably hold said front door open at a selected angle.

8. The magnetic door assembly of claim 1, further including a magnetic bottom plate for cooperative magnetic engagement with said wedge.

9. The magnetic door assembly of claim 1, further including a non-magnetic housing including a magnet therein.

10. The magnetic door assembly of claim 9, wherein said housing comprises an ABS plastic material.

11. The magnetic door assembly of claim 1, wherein said front door can be held open at an angle of up to 180 degrees.

12. An oven having a magnetic positioning hinge for a horizontal door assembly, comprising:

an oven including a left side, a right side, a top, a bottom panel, a front panel and back panel and at least one pivoting front door including a pair of spaced apart aligned horizontal magnetic positioning hinges;

each one of said pair of horizontal magnetic positioning hinges comprising a pair of pivoting hinge plates including a top plate and a bottom plate joined by a pin, said top plate attaching to said front panel of said oven and having a housing having a magnet disposed therein, and said bottom plate including a metal or magnetic material attaching to said door frame supporting said at least one front door alignable with said housing of said top plate, whereby pivoting said front door upward until said bottom plate contacts said housing releasably holds said front door in an upward position.

13. The magnetic door assembly of claim 12, wherein said housing comprises a wedge shaped projection for holding an oven door at a selected angle.

14. The magnetic door assembly of claim 12, further including a magnetic metal bottom plate for cooperative magnetic engagement with said housing.

15. The magnetic door assembly of claim 12, further including a non-magnetic housing including a magnet therein.

16. The magnetic door assembly of claim 15, wherein said housing comprises an ABS plastic material.

17. The magnetic door assembly of claim 12, wherein said front door can be held open at an angle of up to 180 degrees.

18. The oven and magnetic door assembly of claim 12, further including a bottom plate having an opposing magnet for cooperative magnetic engagement with said housing.

19. The oven and magnetic door assembly of claim 12, wherein said oven is a convention oven.

20. The oven and magnetic door assembly of claim 12, wherein said oven is a controlled vapor oven.

21. The oven and magnetic door assembly of claim 12, wherein said wedge is formed at a selected preset angle correlating to a selected degree the front door is held open upon said magnet or magnetic material of said bottom plate contacts said wedge containing said magnet.

22. The oven and magnetic door assembly of claim 12, wherein said wedge is formed of a selected size and shape to cooperatively engage said magnetic metal or magnetic material and releasably hold said front door open at a selected angle.

* * * * *